UNITED STATES PATENT OFFICE.

SOLOMON W. KIRK, OF PHILADELPHIA, PENNSYLVANIA.

IMPROVEMENT IN SEPARATING METALS FROM ORES.

Specification forming part of Letters Patent No. 112,153, dated February 28, 1871.

I, SOLOMON W. KIRK, of the city and county of Philadelphia, and State of Pennsylvania, have invented a certain Process for Separating Metals from their Ores, of which the following is a specification:

Take of graphite, coke, or charcoal, one pound; of chloride of sodium, one-half pound; of resin, one-quarter pound. After being thoroughly mixed, this composition is added to one hundred pounds of ore, and the whole placed in a closed crucible or retort, and submitted to a white heat of from thirty minutes to one hour and a half duration.

The carbon vapor, which is produced by the heat, unites with the chlorine of the salt, producing a chloride of carbon in its nascent state, which acts energetically upon the sulphur contained in the ore. A species of chemical action, which is attended with combustion, takes place in the closed crucible or retort, which increases the degree of heat, eliminating the sulphur, and reducing, at the same time, the ore, and reviving the metal contained therein.

The chemical action above mentioned is produced at the time the proper temperature is reached, converting a portion of the resin into hydrocarbon oil. At the same time the hydrogen combines energetically with the chlorine, producing an intense heat in the retort or crucible, while a different portion of the chlorine unites with the carbon, producing a chloride of carbon.

The carbon vapor liberated from the metallic carbon would alone answer for the reduction of a certain class of ores free from sulphur, but, in the case of sulphurets, would fail entirely; neither would there be any increased temperature in the retort or crucible, as there is from the uniting of hydrogen contained in the oil above mentioned with the chlorine gas.

When a considerable quantity of silica is contained in the ore and a liquid slag is desired, there is added to the above ingredients one-half pound of fluoride of sodium and aluminum, or any salt generally used as a fluxing material for silica.

It is well known that the above materials have been used in various ways for assaying and working metals. For instance, salt is used extensively for converting the sulphurets into chlorides, after having been stamped to the proper degree of fineness, after which iron is used to take up the chlorine, and mercury the silver.

Carbon is also used for reducing the oxides of the various ores, and, at the same time, salts of soda is used for converting any foreign substance that the ore may contain—such as silica and alumina—into a glass or slag.

Resin has also been used in various ways for working iron, steel, &c.

I therefore do not wish to claim any of the above-named materials when used in an open crucible or furnace in any proportion; but I do claim to have invented a new process for working what is now termed "mill ores," dispensing with stamping, roasting, and amalgamation, thereby saving considerable labor and expense.

I claim as my invention—

The ingredients above specified, mixed in an increased or diminished proportion to suit the different characters of the ores to be operated upon, when placed in an air-tight crucible or retort, and acting upon the ore with the chloride of carbon in its nascent state, as and for the purpose herein set forth.

In testimony whereof I have hereunto signed my name in the presence of two subscribing witnesses.

SOLOMON W. KIRK.

Witnesses:
 ISAAC R. OAKFORD,
 J. M. COLGAN.